United States Patent
Eisenhardt et al.

(10) Patent No.: US 7,129,673 B2
(45) Date of Patent: Oct. 31, 2006

(54) METHOD AND DEVICE FOR THE REGULATION OF PERMANENT-MAGNET EXCITED SYNCHRONOUS MACHINE HAVING REDUCED POWER OSCILLATIONS IN THE HIGHER ROTATIONAL SPEED RANGE

(75) Inventors: Martin Eisenhardt, Renningen (DE); Alexander Seufert, Hammelburg (DE); Klaus Rechberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/514,152

(22) PCT Filed: Feb. 11, 2003

(86) PCT No.: PCT/DE03/00381

§ 371 (c)(1),
(2), (4) Date: Oct. 28, 2004

(87) PCT Pub. No.: WO03/094337

PCT Pub. Date: Nov. 13, 2003

(65) Prior Publication Data

US 2006/0055361 A1 Mar. 16, 2006

(30) Foreign Application Priority Data

May 3, 2002 (EP) .................................. 10219821

(51) Int. Cl.
*H02P 6/10* (2006.01)
(52) U.S. Cl. ....................... 318/722; 318/254
(58) Field of Classification Search ................ 318/138, 318/139, 254, 432–434, 439, 720–724; 180/65.1, 180/65.2, 65.8
See application file for complete search history.

(56) References Cited

U.S. PATENT DOCUMENTS

| | | | | |
|---|---|---|---|---|
| 5,549,172 A | * | 8/1996 | Mutoh et al. | 180/65.1 |
| 6,377,017 B1 | * | 4/2002 | Kondou et al. | 318/727 |
| 6,833,646 B1 | * | 12/2004 | Joong et al. | 310/114 |
| 6,949,902 B1 | * | 9/2005 | Nakayama et al. | 318/432 |

FOREIGN PATENT DOCUMENTS

| | | |
|---|---|---|
| DE | 199 28 481 | 12/2000 |
| DE | 100 35 783 | 2/2001 |
| DE | 100 23 908 | 12/2001 |
| DE | 100 44 181 | 4/2002 |
| EP | 1 187 307 | 3/2002 |

OTHER PUBLICATIONS

Periodical, ETEP, vol. 8, No. 3, May/Jun. 1998, pp. 157-166.

* cited by examiner

*Primary Examiner*—Bentsu Ro
(74) *Attorney, Agent, or Firm*—Kenyon & Kenyon LLP

(57) ABSTRACT

The invention concerns a method and an apparatus for field-oriented control of a permanent-magnet-excited synchronous machine. Conversion of an ascertained longitudinal voltage component and an ascertained transverse voltage component into triggering pulses for the synchronous machine is accomplished in a low rotation speed range using a pulse-width-modulated inverter, and in a high rotation speed range using a block switching mechanism or a software program functionally corresponding to a block switching mechanism. The invention reduces output oscillations in the upper rotation speed range that occur in known systems as a result of angular inaccuracies with respect to the target voltage zero transition and the voltage zero transition that is actually implemented.

20 Claims, 4 Drawing Sheets

METHOD AND DEVICE FOR THE REGULATION OF PERMANENT-MAGNET EXCITED SYNCHRONOUS MACHINE HAVING REDUCED POWER OSCILLATIONS IN THE HIGHER ROTATIONAL SPEED RANGE

BACKGROUND OF THE INVENTION

In automotive engineering, it is already known to incorporate a permanent-magnet-excited synchronous machine (PM synchronous machine) into the drive train of a vehicle, between the internal combustion engine and the transmission, as an integrated crankshaft starter/generator.

A PM synchronous machine of this kind is controlled in a rotor-field-oriented coordinate system. An example of a field-oriented current control system for a PM synchronous machine having a pulse-width-modulated inverter is shown in FIG. 1. It is based on an actual-value measurement of the phase currents of a three-phase current system and on a determination, based on the measured actual values, of a longitudinal and a transverse component of the control voltage with respect to the rotor position. The transverse current is proportional to the desired torque.

In this control system, the phase currents ia, ib, ic derived from the three-phase system of the PM machine are converted, in a Park transformer 13, into currents Id_actual and Iq_actual of a rectangular coordinate system. Current Id_actual represents the actual value for the machine's longitudinal current. Current Iq_actual designates the actual value for the machine's transverse current.

Actual longitudinal current value Id_actual is conveyed via a superimposition element 12 to a longitudinal current controller 1, and actual transverse current value Iq_actual as the actual value to a transverse current controller 2. Superimposition element 12 receives, as a further input signal, a feedback signal that is obtained from output variable uq' of a steady-state decoupling network 5. In addition to providing the decoupling that is important for the control system, steady-state decoupling network 5 also performs the task of achieving, in coaction with output limiters 3 and 4 and an anti-windup procedure at longitudinal current controller 1, a field attenuation in the upper rotation speed range. This field attenuation of the PM synchronous machine at higher rotation speeds is necessary because otherwise the induced machine voltage would be greater than the maximum power converter output voltage. The latter voltage is limited by the supply voltage, which is the motor vehicle's electrical system voltage. In this field attenuation mode, the power converter is operated in an overmodulated state so that the power converter output voltage is no longer sinusoidal.

A setpoint signal generated by a longitudinal current setpoint generator 9 is conveyed to the setpoint input of longitudinal current controller 1, and a setpoint signal generated by a transverse current setpoint generator 14 is conveyed to the setpoint input of transverse current controller 2. Transverse current setpoint generator 14 generates the transverse current setpoint signal as a function of the output signal of a battery voltage sensor.

A control variable Id* for the longitudinal current is made available at the output of longitudinal current controller 1, and a control variable Iq* for the transverse current at the output of transverse current controller 2. These control variables are conveyed to steady-state decoupling network 5 which, using the aforesaid control variables, ascertains a longitudinal voltage component ud' and a transverse voltage component uq' for the control voltage of the PM synchronous machine.

These control voltage components ud' and uq', which are control voltage components in the rectangular coordinate system, are conveyed via respective output limiters 3 and 4 to an inverse Park transformer 6. The purpose of the latter is to convert the limited control voltage components ud and uq, present in the rectangular coordinate system, into control voltage components ua, ub, and uc of the three-phase system. These are converted, in a pulse-width-modulated inverter 7, into triggering pulses for PM synchronous machine 8.

Transverse voltage component uq' of the control voltage, which is outputted at the output of steady-state decoupling network 5, is conveyed to absolute value generator 10, which ascertains the absolute value |uq'| of the aforesaid transverse voltage component.

The output signal of absolute value generator 10 is used as the input signal for a threshold value switch 11. If the absolute value |uq'| exceeds a predefined threshold value, a value of 0 is then outputted at the output of threshold value switch 11. If the absolute value |uq'| falls below the predefined threshold value, a value of 1 is then outputted at the output of threshold value switch 11.

Exemplified embodiments for the configuration of a decoupling network in which a steady-state machine model is stored are described in the Applicant's DE 100 44 181.5.

DE 100 23 908 A1 discloses a method for ascertaining the magnet wheel position of an electrical machine (which is, for example, a three-phase generator with pulse-width-modulated inverter), a rotor winding, a stator equipped with inductances, and a voltage source disposed between two phase terminals additionally being provided. With this method, circuit elements can be used to branch into two phases, in which the respective phase voltage profiles are measured. Superimposing them allows an unequivocal determination of the magnet wheel position. With the known method, the rotor positions for each of the voltage profiles are stored in table form.

The periodical ETEP, Vol. 8, No. 3, May/June 1998, pp. 157–166, furthermore describes a permanent-magnet-excited synchronous machine with a field attenuation mode, in which a large ratio exactuals between the maximum and basic speeds. This is achieved by way of an additional negative D component of the stator current. In the context of regulation of the known synchronous machine, a measurement of the rotor position is performed using the output signals of three Hall sensors, one Hall sensor being associated with each of the phases U, V, W.

DE 199 28 481 A1 discloses a method for generating control variables for the longitudinal and transverse voltage to represent respectively the flux-forming current and torque-forming current in a field-oriented control system for rotating-field machines in consideration of the stator voltage drop and the steady-state internal voltage, in which the steady-state internal voltage is calculated on the basis of setpoint variables of the currents. Also known from this document are a method for ascertaining the angular rotor frequency of an asynchronous machine controlled in field-oriented fashion, and a method for sensing and pairing at least two phase currents of an asynchronous machine in order to implement a field-oriented control system.

SUMMARY OF THE INVENTION

The invention makes available a control system in which the output oscillations occurring in known systems in the upper rotation speed range are reduced. The invention allows the power converter to be easily controlled over a wide range of rotation speeds. This is achieved by the fact that angular inaccuracies with regard to the target voltage zero transition and the voltage zero transition that is actually implemented, resulting from the ratio between the fundamental current oscillation and the pulse frequency, are reduced because of the smooth transition from a PWM mode to a block mode when a predefined rotation speed threshold is reached.

The computation unit required in the context of the invention results in only a slight additional processor load, since the computation unit can operate independently of rotation speed at the constant control frequency. The switching frequency of the power converter remains low, so that its switching losses are also minimized.

BRIEF DESCRIPTION OF THE DRAWINGS

The appended Figures serve to explain the invention by way of example.

DETAILED DESCRIPTION OF THE INVENTION

Figure 1:
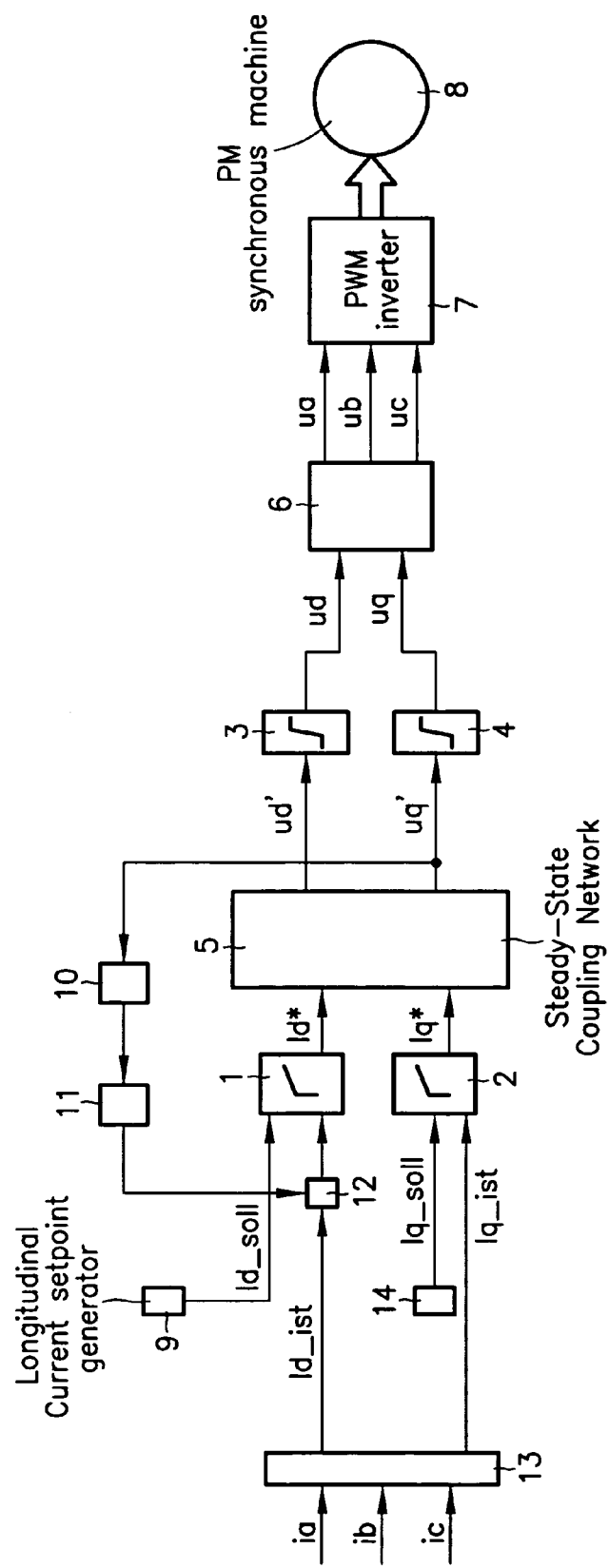
FIG. 1 is a block diagram of a conventional field-oriented current control system for a PM synchronous machine.
Figure 2:
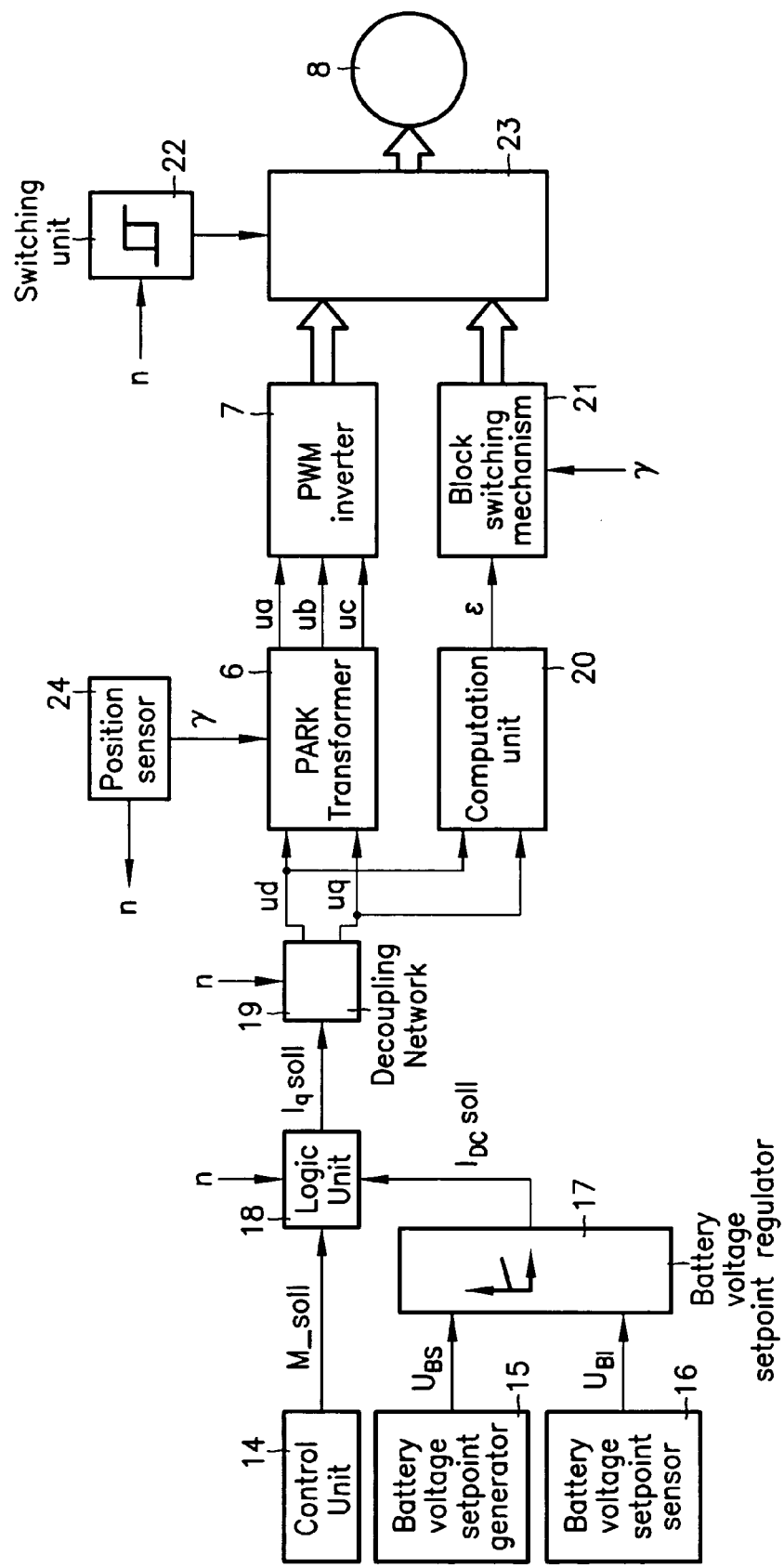
FIG. 2 is a block diagram of a first exemplified embodiment of a field-oriented current control system according to the present invention for a PM synchronous machine.

FIG. 2 is a block diagram of a first exemplary embodiment of a field-oriented current control system according to the present invention for a PM synchronous machine 8. with this control system, it is not necessary to derive phase currents from the multi-phase system of the PM machine, and convert them by means of a Park transformer into the actual longitudinal current value and actual transverse current value of a rectangular coordinate system.

The apparatus depicted in FIG. 2 has a logic unit 18 that makes available at its output a setpoint Iq_setpoint for the transverse current. Logic unit 18 is additionally equipped with several inputs. A first input of logic unit 18 is connected to a higher-order control unit 14. A second input of logic unit 18 is connected to the output of a battery voltage regulator 17. A datum regarding the rotation speed n of the machine is conveyed to the third input of logic unit 18.

Battery voltage regulator 17 is connected on the input side to a battery voltage setpoint generator 15 and to a battery voltage sensor 16. Battery voltage setpoint generator 15, for example a higher-order energy management system, supplies battery setpoint voltage UBS to battery voltage regulator 17. Battery voltage sensor 16 is provided in order to measure actual battery voltage UBI. The actual battery voltage is picked off, for example, at a link circuit capacitor (not shown).

The starting operation proceeds as follows: A starting instruction containing a datum regarding target torque M_setpoint comes from higher-order control unit 14. From this, transverse current setpoint Iq_setpoint is derived in logic unit 18. Transverse current setpoint Iq_setpoint is conveyed to steady-state decoupling network 19, which contains a steady-state machine model. In this decoupling network, the transverse current setpoint is converted, with incorporation of the rotation speed n and the stored machine model, into a longitudinal voltage component ud and a transverse voltage component uq of the control voltage. A stored table in which machine parameters are taken into account is used here. Depending on the accuracy of the machine model, this conversion results in varying levels of performance loss.

Above a predefined rotation speed threshold value that lies, for example, at 500 rpm, switchover logic unit 18 carries out a switchover operation on the basis of which the output signal IDC_setpoint of battery voltage regulator 17 is now forwarded, as the transverse current setpoint Iq_setpoint, to decoupling network 19. In the latter, the transverse current setpoint is converted into a longitudinal voltage component ud and a transverse voltage component uq of the control voltage, incorporating the rotation speed n. The stored table in which machine parameters are taken into account is used here as well. Inaccuracies in the machine model are compensated for by the higher-order voltage regulation system, and do not cause any loss of efficiency in generator mode.

The voltage components ud and uq ascertained by means of the steady-state machine model, which are control voltage components in the rectangular coordinate system, are conveyed to an inverse Park transformer 6. The latter's purpose is to convert the control voltage components ud and uq present in the rectangular coordinate system, in consideration of the magnet wheel angle γ that is ascertained by a position sensor 24, into control voltage components ua, ub, and uc of the three-phase system. These are forwarded to a pulse-width-modulated inverter 7 that makes triggering pulses for PM synchronous machine 8 available at its output. The output of pulse-width-modulated inverter 7 is connected via a switching unit 23 to PM machine 8 that is to be controlled.

The voltage components ud and uq are further conveyed to a computation unit 20 that ascertains from these voltage components the target angle ε between the rotor pole axis and the target stator voltage space vector. This is done according to the following equation:

$$\epsilon = arctan(ud/uq).$$

Since aperiodic variables having a time constant that is the same over the entire control range are controlled in the context of the field-oriented control system, computation unit operates at the same clock frequency as the control system.

The output signal of computation unit 20 is conveyed to a block switching mechanism 21 that is clocked directly from the magnet wheel angle γ. Information about the magnet wheel angle is obtained, for example (as already stated above), by a position sensor 24. Block switching mechanism 21, the output signal of which is also conveyed to switchover logic unit 23, serves to select triggering pulses in accordance with one of six possible switching states of the power converter.

Instead of a block switching mechanism, a software program functionally corresponding to the block switching mechanism can also be used.

In switchover logic unit 23, a switchover is performed such that either the triggering pulses generated in pulse-width-modulated inverter 7, or those generated in block switching mechanism 21, are conveyed to PM machine 8. This switchover is made as a function of rotation speed n, in consideration of an adjustable switching hysteresis that is implemented by means of hysteresis circuit 22. The hysteresis region is located, for example, between 800 and 1000 revolutions per minute.

Triggering in this fashion ensures a smooth transition from pulse-width-modulated inverter mode, in which the output signals of circuit block 7 are conveyed via switchover logic unit 23 to PM machine 8, to block mode, in which the output signals of block switching mechanism 21 are conveyed via switchover logic unit 23 to PM machine 8. This is attributable to the fact that the same controller structure is used for the entire rotation speed range; and that at the switchover rotation speed, the output signal of block switching mechanism 21 is identical to the output signal of pulse-width-modulated inverter 7, the output signal of pulse-width-modulated inverter 7 being affected by a statactualical angular inaccuracy (or "jitter") that becomes greater with increasing rotation speed and results in undesirable output fluctuations in the upper rotation speed range.

The transition described above from pulse-width-modulated inverter mode to block mode is performed in order to eliminate those undesirable output fluctuations in the upper rotation speed range.

The output fluctuations in the upper rotation speed range that occur in the context of the exactualing art result from the fact that the switching frequency of the pulse-width-modulated inverter, or PWM converter, must not be set too high in terms of the losses that occur. A PWM frequency of, for example, 8 kHz is therefore used for application in a crankshaft starter/generator. The correlation between rotation speed and fundamental current oscillation frequency is as follows:

$f=(n/60)*p.$

Figure 3:
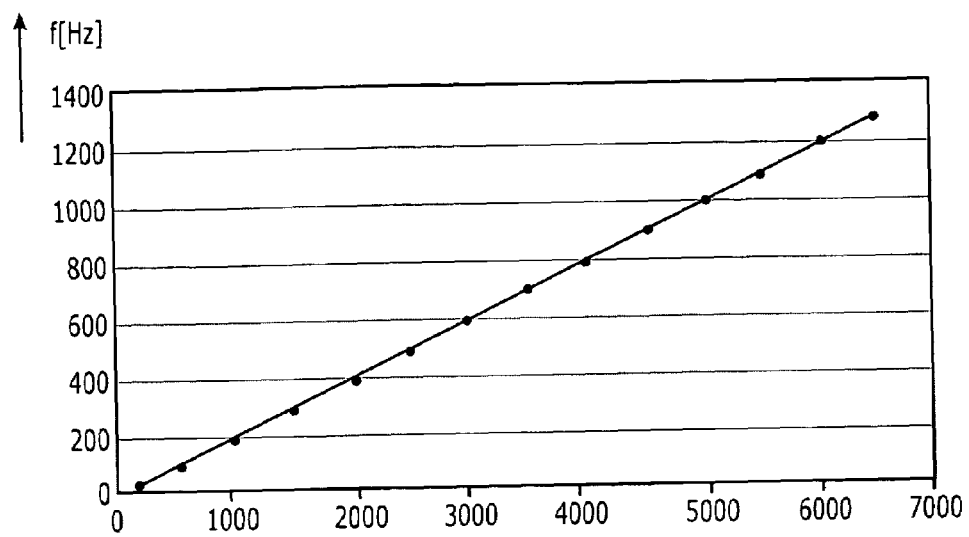
FIG. 3 is a diagram illustrating the dependency of the fundamental current oscillation frequency on rotation speed.

For the rotation speed range of a 2* p=24-pole crankshaft starter/generator that has a rotation speed range between 0 and 6500 revolutions per minute, a frequency range of 0 to 1300 Hz is therefore required. This is shown in FIG. 3, which is a diagram to illustrate the dependency of the fundamental current oscillation frequency on rotation speed. In this diagram, rotation speed n (in revolutions per minutes) is plotted on the abscissa, and frequency f (in Hz) is plotted on the ordinate.

Figure 4:
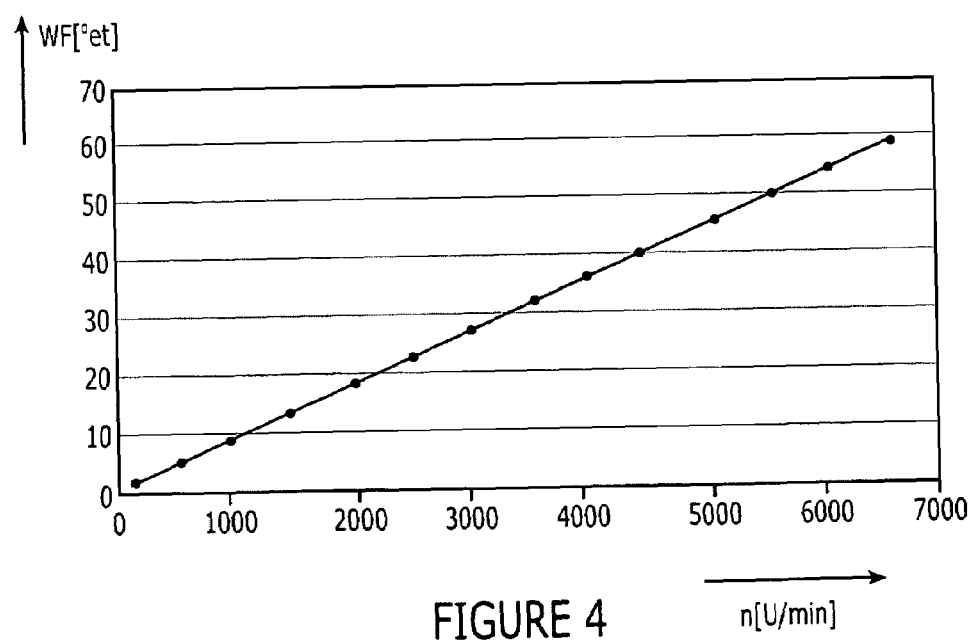
FIG. 4 is a diagram illustrating the maximum angular error as a function of rotation speed.

Since a PWM frequency of 8 kHz is present over the entire operating range, the ratio between the fundamental current oscillation and the pulse frequency results in an angular inaccuracy in terms of the target voltage zero transition and the actually implemented voltage zero transition. This is shown in FIG. 4, which is a diagram to illustrate, for a PWM frequency of 8 kHz, the maximum angular error in terms of target voltage zero transition as a function of rotation speed. In this diagram, rotation speed (in revolutions per minute) is plotted on the abscissa, and angular error WF (in degrees) is plotted on the ordinate.

This statactualical inaccuracy, or jitter, results in undesirable output fluctuations in the upper rotation speed range. To eliminate this statactualical inaccuracy, a rotation-speed-dependent switchover or rotation-speed-dependent transition is made, in accordance with the exemplified embodiment described above with reference to FIG. 2, from a PWM operating mode to a block mode. As an alternative to this, the aforesaid output fluctuations could also be eliminated by increasing the PWM frequencies, for example to switching frequencies of up to 90 kHz. This is not advisable, however, because of high switching losses and a considerable outlay for the power converter.

Further advantages of the exemplified embodiment shown in FIG. 2 are that only a slight additional processor load exactuals, since computation unit 20 can operate at a constant control frequency regardless of rotation speed. In a context of PWM operation over the entire control region, the PWM frequency (and therefore the frequency for the inverse Park transformation) would need to be increased with rotation speed, which would result in a heavy processor load.

In addition, the switching frequency of the power converter is low This is associated with low switching losses in the power converter.

The angular inaccuracies attributable to PWM clocking, and therefore also the undesirable output oscillations attributable to them, are moreover eliminated. The angular accuracy depends only on the position sensor itself.

Figure 5:
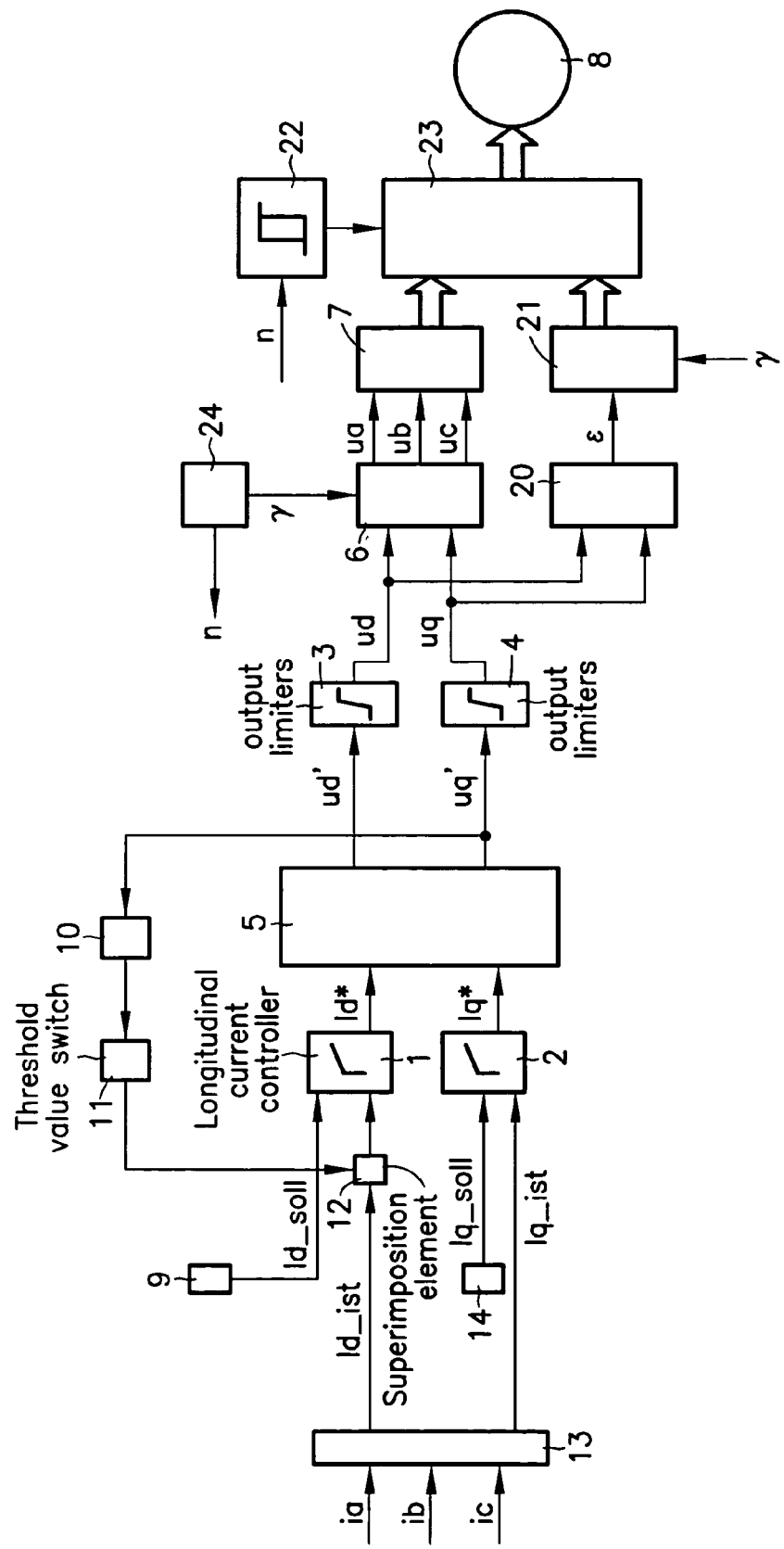
FIG. 5 is a block diagram of a second exemplified embodiment of a field-oriented current control system according to the present invention for a PM synchronous machine.

FIG. 5 is a block diagram showing a second exemplified embodiment of a field-oriented current control system according to the present invention for a PM synchronous machine.

This exemplified embodiment differs from the first exemplified embodiment shown in FIG. 2 in terms of the manner in which the longitudinal component ud and transverse component uq of the control voltage for the PM synchronous machine are generated. In the exemplified embodiment shown in FIG. 5, this occurs as follows:

Phase currents ia, ib, ic derived from the three-phase system of the PM machine are converted, in a Park transformer 13, into currents Id_actual and Iq_actual of a rectangular coordinate system. Current Id_actual represents the actual value for the machine's longitudinal current. Current Iq_actual designates the actual value for machine's transverse current.

Actual longitudinal current value Id_actual is conveyed via a superimposition element 12 to a longitudinal current controller 1, and actual transverse current value Iq_actual is conveyed as the actual value to a transverse current controller 2. Superimposition element 12 receives as a further input signal a feedback signal that is obtained from output variable uq' of a steady-state decoupling network 5. In addition to providing the decoupling that is important for the control system, steady-state decoupling network 5 also performs the task of achieving, in coaction with output limiters 3 and 4 and an anti-windup procedure at longitudinal current controller 1, a field attenuation in the upper rotation speed range. This field attenuation of the PM synchronous machine at higher rotation speeds is necessary because otherwise the induced machine voltage would be greater than the maximum power converter output voltage. The latter voltage is limited by the supply voltage, which is the motor vehicle's electrical system voltage. In this field attenuation mode, the power converter is operated in an overmodulated state so that the power converter output voltage is no longer sinusoidal.

A setpoint signal generated by a longitudinal current setpoint generator 9 is conveyed to the setpoint input of longitudinal current controller 1, and a setpoint signal generated by a transverse current setpoint generator 14 is conveyed to the setpoint input of transverse current controller 2. Transverse current setpoint generator 14 generates the transverse current setpoint signal as a function of the output signal of a battery voltage sensor.

A control variable Id* for the longitudinal current is made available at the output of longitudinal current controller 1, and a control variable Iq* for the transverse current at the output of transverse current controller 2. These control variables are conveyed to steady-state decoupling network 5 which, using the aforesaid control variables, ascertains a longitudinal voltage component ud' and a transverse voltage component uq' for the control voltage of the PM synchronous machine.

These control voltage components ud' and uq', which are control voltage components in the rectangular coordinate system, are converted via respective output limiters 3 and 4 into a limited longitudinal voltage component ud and a limited transverse voltage component uq.

Transverse voltage component uq' of the control voltage that is outputted at the output of steady-state decoupling network 5 is conveyed to absolute value generator 10, which ascertains the absolute value |uq'| of the aforesaid transverse voltage component.

The output signal of absolute value generator 10 is used as the input signal for a threshold value switch 11. If the absolute value |uq'| exceeds a predefined threshold value, a value of 0 is then outputted at the output of threshold value switch 11. If the absolute value |uq'| falls below the predefined threshold value, a value of 1 is then outputted at the output of threshold value switch 11.

Further processing of the longitudinal component ud and transverse component uq of the control voltage, in order to obtain triggering pulses for the PM synchronous machine, is performed as already described in connection with the first exemplified embodiment.

What is claimed is:

1. A method for field-oriented control of a permanent-magnet-excited synchronous machine, comprising:
    ascertaining a longitudinal voltage component (ud) and a transverse voltage component (uq) of a control voltage; and
    converting the ascertained longitudinal voltage component and the ascertained transverse voltage component into triggering pulses for the synchronous machine,
    the conversion of the ascertained longitudinal voltage component and the ascertained transverse voltage component into triggering pulses for the synchronous machine being performed, in a low rotation speed range, using a pulse-width-modulated inverter (7) and being performed, in a high rotation speed range, using a block switching mechanism (21) or a software program functionally corresponding to a block switching mechanism, as a function of the target angle ($\epsilon$) between the rotor pole axis and the target stator voltage space vector.

2. The method as recited in claim 1, wherein the target angle ($\epsilon$) is ascertained from the ascertained longitudinal voltage component and the ascertained transverse voltage component according to the following equation:

$$\epsilon = arctan(ud/uq).$$

3. The method as recited in claim 2, wherein a selection of one of several possible switching states of the power converter is performed in the block switching mechanism or using the software program corresponding to the block switching mechanism.

4. The method as recited in claim 3, wherein selection of one of several possible switching states of the power converter is made in consideration of the rotor position angle ($\gamma$).

5. The method as recited in claim 2, wherein a rotation-speed-dependent switchover is performed between output signals of the pulse-width-modulated inverter (7) and output signals of the block switching mechanism (21) or the triggering signals generated by means of the software program.

6. The method as recited in claim 1, wherein a selection of one of several possible switching states of the power converter is performed in the block switching mechanism or using the software program corresponding to the block switching mechanism.

7. The method as recited in claim 6, wherein selection of one of several possible switching states of the power converter is made in consideration of the rotor position angle ($\gamma$).

8. The method as recited in claim 7, wherein a rotation-speed-dependent switchover is performed between output signals of the pulse-width-modulated inverter (7) and output signals of the block switching mechanism (21) or the triggering signals generated by means of the software program.

9. The method as recited in claim 6, wherein a rotation-speed-dependent switchover is performed between output signals of the pulse-width-modulated inverter (7) and output signals of the block switching mechanism (21) or the triggering signals generated by means of the software program.

10. The method as recited in claim 1, wherein a rotation-speed-dependent switchover is performed between output signals of the pulse-width-modulated inverter (7) and output signals of the block switching mechanism (21) or the triggering signals generated by means of the software program.

11. The method as recited in claim 10, wherein the rotation-speed-dependent switchover is performed in considerqation of a switching hystersis.

12. An apparatus for field-oriented control of a permanent-magnet-excited sychronus machine, comprising:
    circuit means (17, 18, 19; 1–5, 10–12) for ascertaining a longitudinal voltage component (ud) and a transverse voltage component (uq) of a control voltage;
    first means (6, 7) for converting the ascertained longitudinal voltage component (ud) and the ascertained transverse voltage component (uq) into triggering pulses for the synchronous machine, said first means including a pulse-width-modulated inverter(7);
    second means (20, 21) for converting the ascertained longitudinal voltage component (ud) and the ascertained transverse voltage component (uq) into triggering pulses for the synchronous machine, said second means including a block switching mechanism (21) or a software program functionally corresponding to a block switching mechanism and being provided for conversion as a function of the target angle ($\epsilon$) between the rotor pole axis and the target stator voltage space vector; and
    a switchover unit (23) that makes available at its output, as a function of rotation speed, triggering pulses generated either by the pulse-width-modulated inverter (7) or by the block switching mechanism (21) or by the software program.

13. The apparatus as recited in claim 12, further comprising a computation unit (20) which possesses an input for the ascertained longitudinal voltage component (ud), an input for the ascertained transverse voltage component (uq), and an output for a datum concerning the target angle ($\epsilon$) between the rotor pole axis and the target stator voltage space vector.

14. The apparatus as recited in claim 13, wherein the computation unit (20) ascertains the target angle ($\epsilon$) according to the following equation:

$$\epsilon = arctan(ud/uq).$$

15. The apparatus as recited in claim 14, wherein the block switching mechanism (21) or the software program is provided for the selection of one of several switching states of the power converter.

16. The apparatus as recited in claim 13, wherein the block switching mechanism (21) or the software program is provided for the selection of one of several switching states of the power converter.

17. The apparatus as recited in claim 16, wherein selection of one of several possible switching states of the power converter is made in consideration of the rotor position angle ($\gamma$).

18. The apparatus as recited in claim 12, wherein the block switching mechanism (21) or the software program is provided for the selection of one of several switching states of the power converter.

19. The apparatus as recited in claim 18, wherein selection of one of several possible switching states of the power converter is made in consideration of the rotor position angle ($\gamma$).

20. The apparatus as recited in claim 12, further comprising a hysteresis circuit (22) whose output signal is conveyed to the switchover unit (23) as a switching signal.

* * * * *